United States Patent
Crosby et al.

(10) Patent No.: US 11,013,238 B2
(45) Date of Patent: May 25, 2021

(54) ROTARY DOUGH CUTTER AND METHOD OF OPERATION

(71) Applicant: General Mills, Inc., Minneapolis, MN (US)

(72) Inventors: Christopher Crosby, Shakopee, MN (US); Peter A Huberg, Shoreview, MN (US); Kara M Hobart, New Hope, MN (US); Ryan D Gifford, Golden Valley, MN (US); Paul Henderson, Farmington, MN (US); James M O'Donnell, St. Louis Park, MN (US)

(73) Assignee: General Mills, Inc., Minneapolis, MN (US)

( * ) Notice: Subject to any disclaimer, the term of this patent is extended or adjusted under 35 U.S.C. 154(b) by 356 days.

(21) Appl. No.: 15/987,987

(22) Filed: May 24, 2018

(65) Prior Publication Data
US 2019/0357549 A1    Nov. 28, 2019

(51) Int. Cl.
| | | |
|---|---|---|
| *A21C 11/10* | (2006.01) | |
| *A21C 11/04* | (2006.01) | |
| *A21C 11/12* | (2006.01) | |

(52) U.S. Cl.
CPC ............ *A21C 11/10* (2013.01); *A21C 11/04* (2013.01); *A21C 11/103* (2013.01); *A21C 11/12* (2013.01)

(58) Field of Classification Search
CPC ......... A21C 11/10; A21C 11/04; A21C 11/08; A21C 11/14; A21C 11/103; A21C 11/12
See application file for complete search history.

(56) References Cited

U.S. PATENT DOCUMENTS

| 255,972 A | 4/1882 | Hahn |
|---|---|---|
| 337,329 A | 3/1886 | Hewett |

(Continued)

FOREIGN PATENT DOCUMENTS

| CN | 107743993 | 3/2018 |
|---|---|---|
| DE | 827183 | 1/1952 |

(Continued)

OTHER PUBLICATIONS

LeMatic, Inc. Modular Baking Systems, "*Random Dough Imprinter*", brochure, 2.

(Continued)

*Primary Examiner* — Seyed Masoud Malekzadeh
(74) *Attorney, Agent, or Firm* — Diederiks & Whitelaw, PLC; John L. Crimmins, Esq.

(57) ABSTRACT

A plurality of dough pieces are produced using a rotary dough cutter including a shaft, a plurality of walls extending radially outward from the shaft and a plurality of interior blades extending radially outward from the shaft. The plurality of walls define a plurality of dough cutter molds. The plurality of dough cutter molds include a first dough cutter mold and a second dough cutter mold. A first wall of the plurality of walls defines part of both the first dough cutter mold and the second dough cutter mold. Each of the plurality of interior blades is located in one of the plurality of dough cutter molds. The plurality of dough pieces are cut from a dough sheet with the plurality of walls. The plurality of dough pieces are scored with the plurality of interior blades. After scoring, the plurality of dough pieces are proofed and then frozen.

19 Claims, 6 Drawing Sheets

(56) References Cited

U.S. PATENT DOCUMENTS

| | | |
|---|---|---|
| 825,775 A | 7/1906 | Stumpf |
| 1,295,024 A | 2/1919 | Gosiewski |
| 1,357,665 A | 11/1920 | Watkins |
| 1,558,206 A | 10/1925 | Simpson |
| 1,728,702 A | 9/1929 | Smith |
| 1,841,495 A | 1/1932 | Mears |
| 1,871,755 A | 8/1932 | Smith |
| 1,944,112 A | 1/1934 | Schröder |
| 1,945,755 A | 2/1934 | Scruggs, Jr. |
| 2,089,396 A | 8/1937 | Meilstrup |
| 2,144,720 A | 1/1939 | Gibson |
| 2,230,778 A | 2/1941 | Flores |
| 2,246,424 A | 6/1941 | Turner |
| 2,263,490 A | 11/1941 | Fox |
| 2,346,839 A | 4/1944 | Harriss et al. |
| 2,431,789 A | 12/1947 | Cosgrove |
| 2,525,987 A | 10/1950 | Williamson |
| 2,619,051 A | 11/1952 | Rice |
| 2,681,625 A | 6/1954 | Babbitt |
| 2,837,043 A | 6/1958 | Grice et al. |
| 2,887,964 A | 5/1959 | Griner |
| 2,999,314 A | 9/1961 | Reichlein |
| 3,024,112 A | 3/1962 | Burgess |
| 3,124,990 A | 3/1964 | Anetsberger et al. |
| 3,128,724 A | 4/1964 | Linder |
| 3,154,986 A | 11/1964 | Reid |
| 3,225,718 A | 12/1965 | Page |
| 3,279,927 A | 10/1966 | Reid |
| 3,364,877 A | 1/1968 | Zublena |
| 3,427,783 A | 2/1969 | Reid |
| D213,574 S | 3/1969 | Kuchuris et al. |
| 3,536,014 A | 10/1970 | Kuchuris et al. |
| D219,300 S | 11/1970 | Samarra |
| 3,595,111 A | 7/1971 | Herschberger |
| 3,603,270 A | 9/1971 | Tangel |
| 3,872,757 A | 3/1975 | Hargadon |
| 3,880,030 A | 4/1975 | Rosengren |
| 3,880,069 A | 4/1975 | Moline |
| 3,911,805 A | 10/1975 | Baird |
| 4,193,272 A | 3/1980 | Bernard |
| 4,276,800 A | 7/1981 | Koppa et al. |
| 4,352,831 A | 10/1982 | Cavanagh et al. |
| 4,382,768 A | 5/1983 | Lifshitz et al. |
| 4,469,476 A | 9/1984 | Cavanagh et al. |
| 4,534,726 A | 8/1985 | Simelunas |
| 4,543,053 A | 9/1985 | Jasniewski |
| 4,578,027 A | 3/1986 | Koppa et al. |
| 4,608,918 A | 9/1986 | Funabashi et al. |
| 4,621,997 A | 11/1986 | Cavanagh, Jr. et al. |
| 4,664,928 A | 5/1987 | McCaffrey |
| 4,671,759 A | 6/1987 | Hayashi et al. |
| 4,789,555 A | 12/1988 | Judd |
| 4,808,104 A | 2/1989 | D'Orlando |
| 4,881,889 A | 11/1989 | Spiel et al. |
| 5,162,119 A | 11/1992 | Pappas et al. |
| 5,204,125 A | 4/1993 | Larsen |
| 5,216,946 A | 6/1993 | Huang et al. |
| 5,306,133 A | 4/1994 | Dayley |
| 5,375,509 A | 12/1994 | Taylor et al. |
| 5,388,489 A | 2/1995 | Dayley |
| 5,402,715 A | 4/1995 | Kurachi et al. |
| 5,529,799 A | 6/1996 | Bornhorst et al. |
| 5,540,140 A | 7/1996 | Rubio et al. |
| 5,552,101 A | 9/1996 | Fujii et al. |
| 5,565,220 A | 10/1996 | Rubio et al. |
| 5,576,033 A | 11/1996 | Herrera |
| 5,601,012 A | 2/1997 | Ellner |
| 5,622,742 A | 4/1997 | Carollo |
| 5,641,527 A | 6/1997 | Burger |
| 5,662,949 A | 9/1997 | Rubio et al. |
| 5,667,834 A | 9/1997 | Rubio et al. |
| 5,687,638 A | 11/1997 | Makowecki |
| D391,125 S * | 2/1998 | Morales .................. D7/676 |
| 5,759,608 A | 6/1998 | Momiyama |
| 5,871,783 A | 2/1999 | Capodieci |
| 6,024,554 A | 2/2000 | Lawrence |
| 6,055,897 A | 5/2000 | Mysliwiec |
| 6,168,817 B1 | 1/2001 | Pavan |
| 6,268,005 B1 | 7/2001 | Brewer |
| 6,279,440 B1 | 8/2001 | Truttmann et al. |
| 6,298,760 B1 | 10/2001 | Truttmann et al. |
| 6,305,260 B1 | 10/2001 | Truttmann et al. |
| 6,530,771 B1 | 3/2003 | Clark |
| 6,555,152 B1 | 4/2003 | Roso |
| 6,562,389 B1 | 5/2003 | Yusufi |
| 6,851,192 B2 | 2/2005 | So |
| 6,902,754 B1 | 6/2005 | Evans et al. |
| 7,331,120 B2 | 2/2008 | Scherb et al. |
| 7,421,947 B2 | 9/2008 | Bryan |
| 7,771,182 B2 | 8/2010 | Fornaguera |
| 7,828,543 B2 | 11/2010 | Herrera |
| 7,914,834 B2 | 3/2011 | Fu et al. |
| 8,622,729 B2 * | 1/2014 | Suski .................. A21C 11/04 |
| | | 425/294 |
| D728,322 S | 5/2015 | Suski et al. |
| 9,044,026 B2 | 6/2015 | Bakhoum |
| 9,220,279 B2 * | 12/2015 | Suski .................. A21C 11/04 |
| D840,191 S | 2/2019 | Hosogane |
| 2006/0286244 A1 | 12/2006 | Fu et al. |
| 2010/0159095 A1 | 6/2010 | Suski et al. |
| 2010/0196564 A1 | 8/2010 | Cepeda Mendoza et al. |
| 2010/0227024 A1 | 9/2010 | Flores |
| 2014/0260847 A1 | 9/2014 | Schneider |

FOREIGN PATENT DOCUMENTS

| | | |
|---|---|---|
| DE | 3332061 | 3/1985 |
| DE | 3410162 | 3/1985 |
| EP | 0130772 | 1/1985 |
| EP | 0841009 | 5/1998 |
| FR | 2195892 | 3/1974 |
| FR | 2643229 | 8/1990 |

OTHER PUBLICATIONS

Gemini Bakery Equipment Co., "We're With You From Beginning to End", brochure, 2.

Doge, Vajra Equipment & Consulting, Inc. "Professional Machinery for Food Industry", brochure, 4.

Rademaker B.V., "Make up Lines the Most Versatile Approach", booklet, 26.

The Moline Company, A Division of Pillsbury Company, Moline Bulletin 529, "Round Cutters", p. 1, printed in USA at least prior to 1991.

* cited by examiner

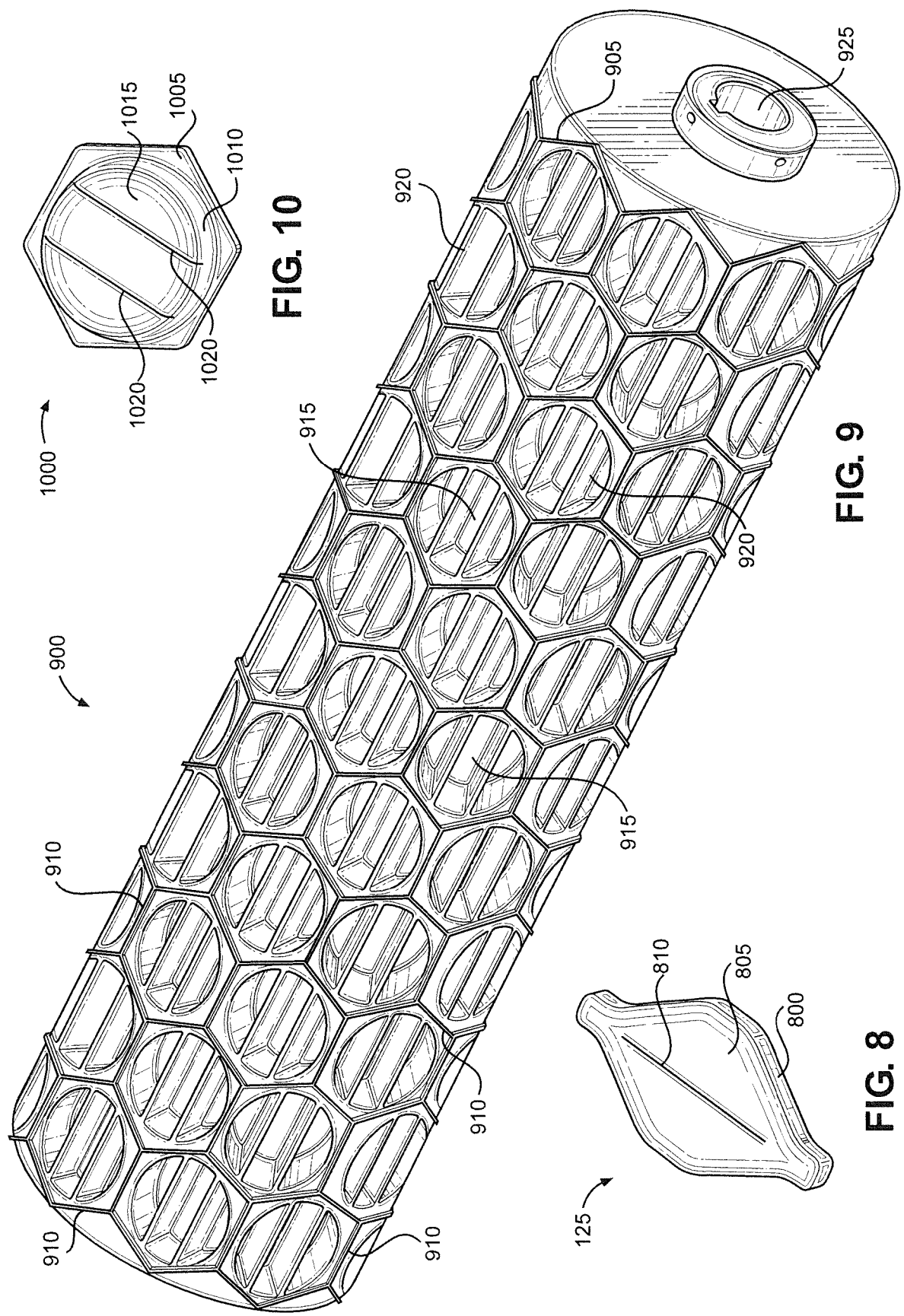

ROTARY DOUGH CUTTER AND METHOD OF OPERATION

BACKGROUND OF THE INVENTION

The invention pertains to the art of food production and, more particularly, to the production of bread products.

Bakery operators sometimes purchase partially finished food products that are then finished in the bakery before being sold to consumers. For example, bakery operators can purchase frozen bread dough, which they thaw, proof and bake prior to sale. Depending on the desired bread product, the bread dough may be scored after proofing and before baking. Generally, it is preferred that the amount of time and labor required to finish such partially finished food products is kept to a minimum. Accordingly, it would be desirable to provide bread dough that is scored before purchase by bakery operators, e.g., prior to being frozen.

SUMMARY OF THE INVENTION

The invention achieves the above goal by providing machinery configured to automatically score dough pieces during formation of the dough pieces from a dough sheet. Specifically, a rotary dough cutter comprises a shaft, a plurality of walls extending radially outward from the shaft and a plurality of interior blades extending radially outward from the shaft. The plurality of walls defines a plurality of dough cutter molds. The plurality of dough cutter molds includes a first dough cutter mold and a second dough cutter mold. A first wall of the plurality of walls defines part of both the first dough cutter mold and the second dough cutter mold. Each of the plurality of interior blades is located in one of the plurality of dough cutter molds. The dough pieces are cut from the dough sheet with the plurality of walls, and the dough pieces are scored with the plurality of interior blades. After scoring, the dough pieces are proofed and then frozen.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 8 is a perspective view of a dough piece formed using the rotary dough cutter.

FIG. 9 is a perspective view of a rotary dough cutter constructed in accordance with another embodiment of the invention.

FIG. 10 is a perspective view of a dough piece formed using the rotary dough cutter of FIG. 9.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, as used in connection with the present invention, terms such as "parallel" and "perpendicular" do not necessarily require, for example, that the relevant items be perfectly parallel. Instead, these terms include a margin of error of +/−5° (regardless of whether the error is by design or due to inherent manufacturing limitations) so long as the error does not prevent the present invention from functioning as intended.

Figure 1:
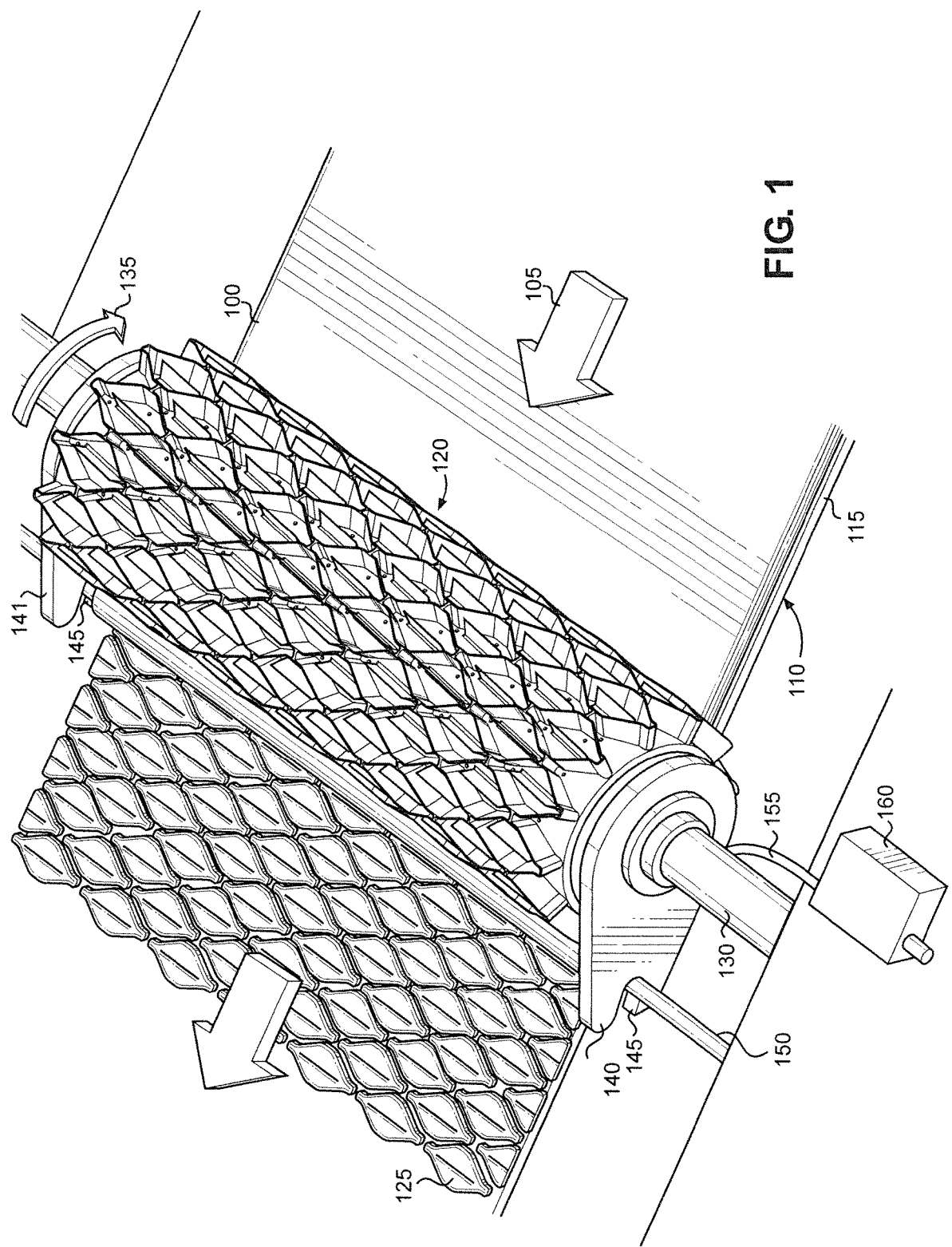
FIG. 1 is a perspective view of a portion of a production line for producing dough pieces in accordance with the invention.

With initial reference to FIG. 1, there is shown a portion of a production line for producing dough pieces in accordance with the present invention. Specifically, FIG. 1 shows a dough sheet 100 being transported in a direction 105 by a conveyor system 110. In the embodiment illustrated, conveyor system 110 includes a conveyor belt 115 on which dough sheet 100 is supported. However, other conveyor systems known in the art can be used with the present invention. Although not shown, it should be understood that the dough of dough sheet 100 is preferably formed in a batch maker or the like and then processed into dough sheet 100.

Dough sheet 100 passes beneath a rotary dough cutter 120, which is configured to repeatedly cut dough pieces from dough sheet 100 as dough sheet 100 is transported in direction 105. For example, FIG. 1 shows a plurality of dough pieces 125. Rotary dough cutter 120 is supported above dough sheet 100 on a driveshaft 130, with rotary dough cutter 120 and driveshaft 130 being aligned perpendicular to direction 105. Rotary dough cutter 120 is configured such that contact between rotary dough cutter 120 and dough sheet 100 or conveyor belt 115 causes rotary dough cutter 120 to rotate in a direction 135 as dough sheet 100 and conveyor belt 115 travel in direction 105. Alternatively, a motor and transmission (not shown) can be provided for driving rotary dough cutter 120 to rotate in direction 135.

Side plates 140 and 141 are located at opposite ends of rotary dough cutter 120. Each of side plates 140 and 141 includes a notch 145 configured to receive a pivot shaft 150, which extends parallel to driveshaft 130. Pivot shaft 150 is configured such that rotary dough cutter 120 and driveshaft 130 can pivot relative to pivot shaft 150 and thereby lift rotary dough cutter 120 up off of dough sheet 100 when desired, e.g., at the end of a production cycle.

An air supply hose 155 is provided for supplying air from an air source, such as an air compressor (not shown). Air that enters rotary dough cutter 120 through air supply hose 155 is used to discharge dough pieces 125 from rotary dough cutter 120 after formation of dough pieces 125 from dough sheet 100. An air regulator 160 is interposed between air supply hose 155 and the air source for regulating airflow.

Figure 2:
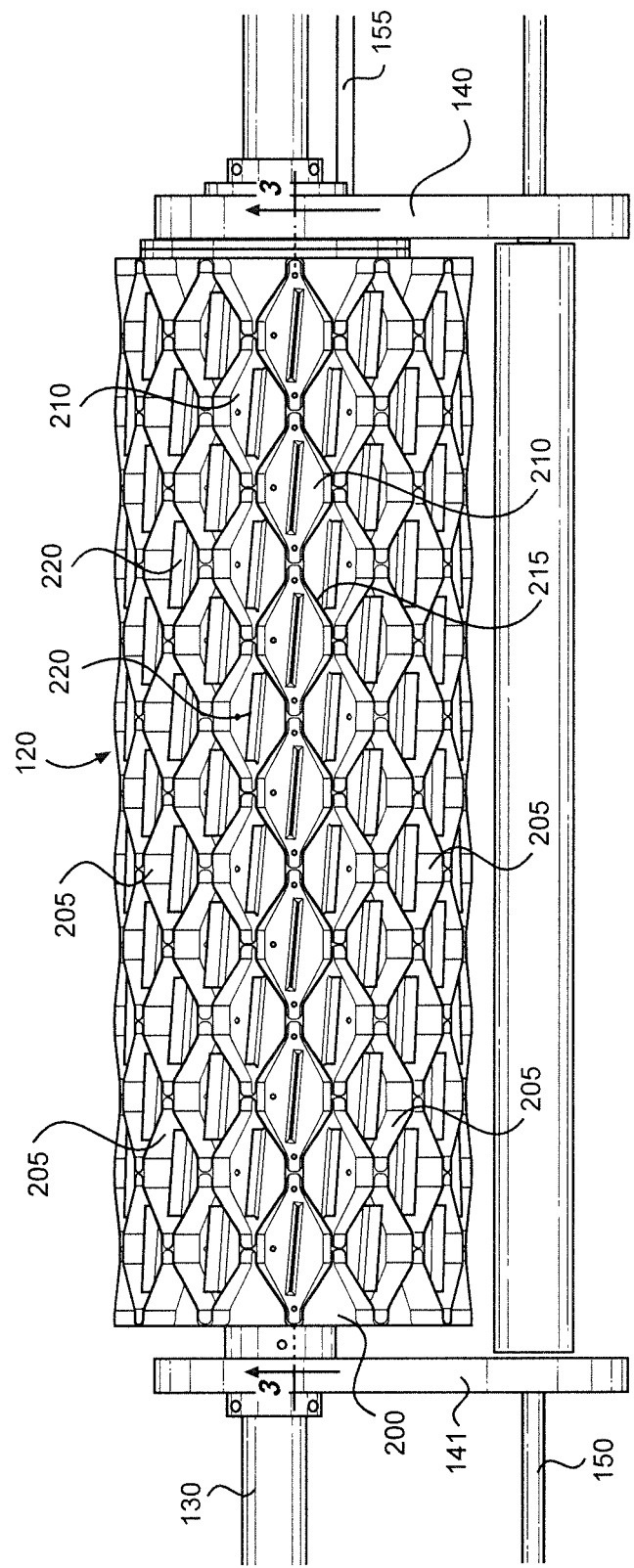
FIG. 2 is a top view of a rotary dough cutter constructed in accordance with the invention.

FIG. 2 shows rotary dough cutter 120 separate from dough sheet 100 and conveyor system 110 but with driveshaft 130, side plates 140 and 141, pivot shaft 150 and air supply hose 155 still present. Rotary dough cutter 120 includes a cylindrical shaft 200. A plurality of walls 205 extends radially outward from shaft 200. Walls 205 define a plurality of dough cutter molds 210. In other words, walls 205 can be considered to be the exterior walls or sidewalls of dough cutter molds 210. Because there is no negative space provided between the majority of dough cutter molds 210, a given portion of one of walls 205 can define part of more than one dough cutter mold 210. For example, a portion 215 defines part of two different dough cutter molds 210.

Walls 205 act as blades and are configured to cut dough pieces 125 from dough sheet 100, with one dough piece 125 being received in and shaped by each dough cutter mold 210. Accordingly, in operation, walls 205 extend all the way through dough sheet 100 to lightly engage conveyor belt 115.

The minimization of negative space between dough cutter molds 210 reduces the amount of dough sheet 100 that is wasted during formation of dough pieces 125, i.e., the amount of dough sheet 100 that does not end up as one of dough pieces 125. This minimization is accomplished by using a tessellated pattern of dough cutter molds 210. That is, shaft 200 is covered with dough cutter molds 210 by repeated use of a single shape, without gaps or overlapping (other than at the ends of shaft 200).

In addition to walls 205, a plurality of interior blades 220 extends radially outward from shaft 200. Interior blades 220 are located within dough cutter molds 210 and are configured to score dough pieces 125 as dough pieces 125 are formed. In other words, interior blades 220 are configured to cut into but not all the way through dough sheet 100. While only one interior blade 220 is shown in each dough cutter mold 210, it should be understood that dough cutter molds 210 can include multiple interior blades 220 if desired.

Figure 3:
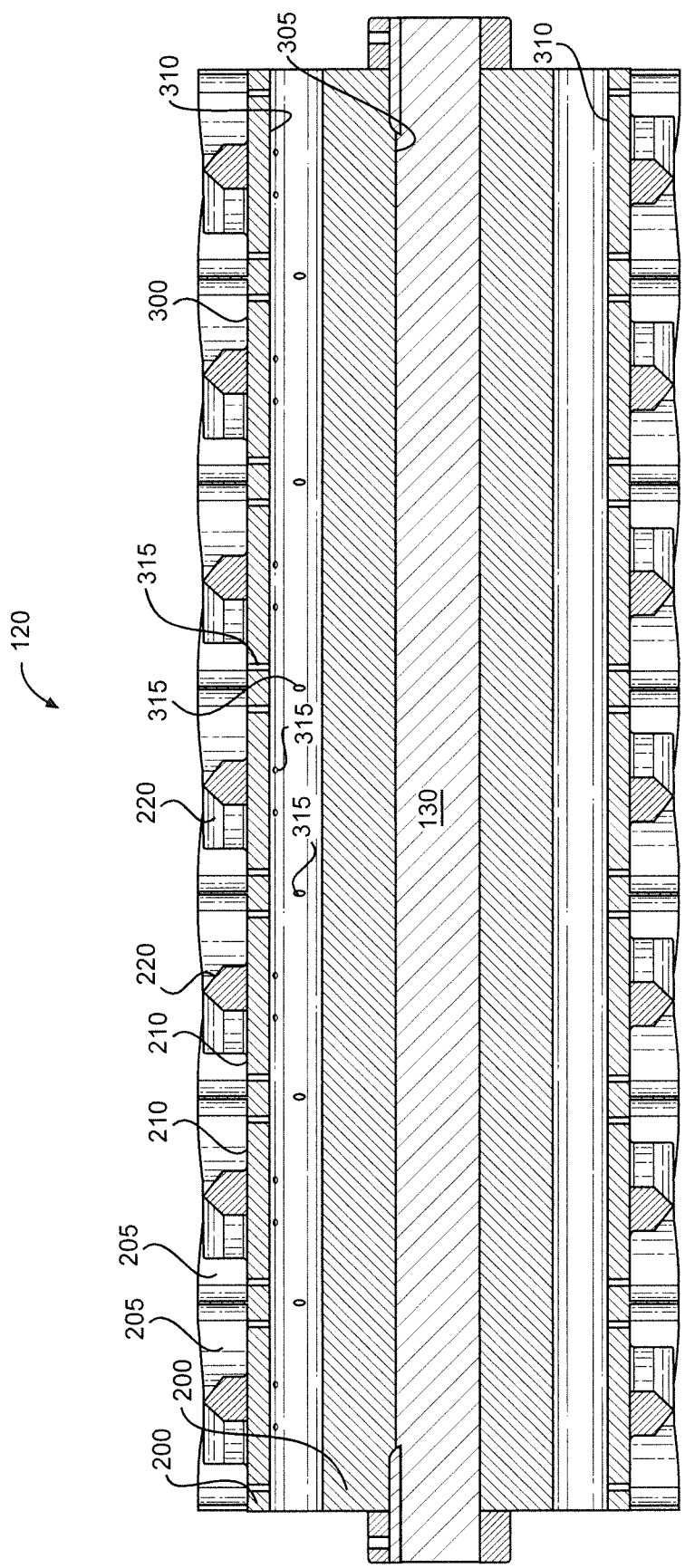
FIG. 3 is a cross section of the rotary dough cutter.

FIG. 3 is a cross section of rotary dough cutter 120 taken along line 3-3 of FIG. 2. This view highlights how walls 205 and interior blades 220 extend radially outward from an exterior 300 of shaft 200. In addition, rotary dough cutter 120 includes a central hole 305 extending longitudinally through shaft 200. Driveshaft 130 extends through central hole 305 to mount rotary dough cutter 120 to driveshaft 130. Rotary dough cutter 120 also includes a plurality of air passages 310 extending longitudinally through shaft 200. A plurality of air outlets 315 extends radially from air passages 310 to dough cutter molds 210. Air passages 310 receive air from air supply hose 155, with the air then traveling through air outlets 315 to dough cutter molds 210. As stated above, the air is used to help discharge dough pieces 125 from dough cutter molds 210. Air passages 310 receive air selectively so that dough pieces 125 are discharged only from the desired dough cutter molds 210 at a predetermined moment, with air passages 310 being selected based on the rotational position of rotary dough cutter 120.

Figure 4:
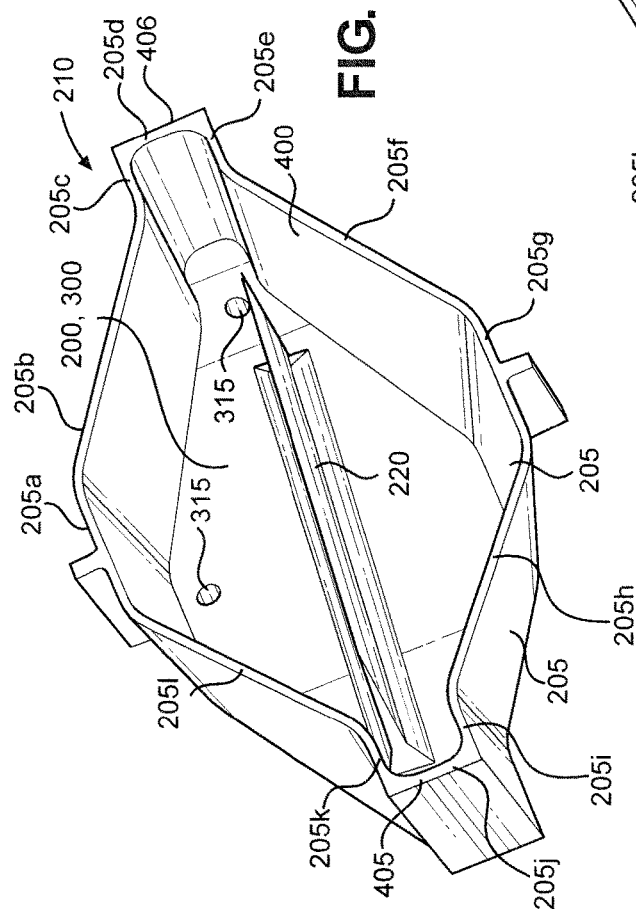
FIG. 4 is a perspective view of a dough cutter mold of the rotary dough cutter.
Figure 5:
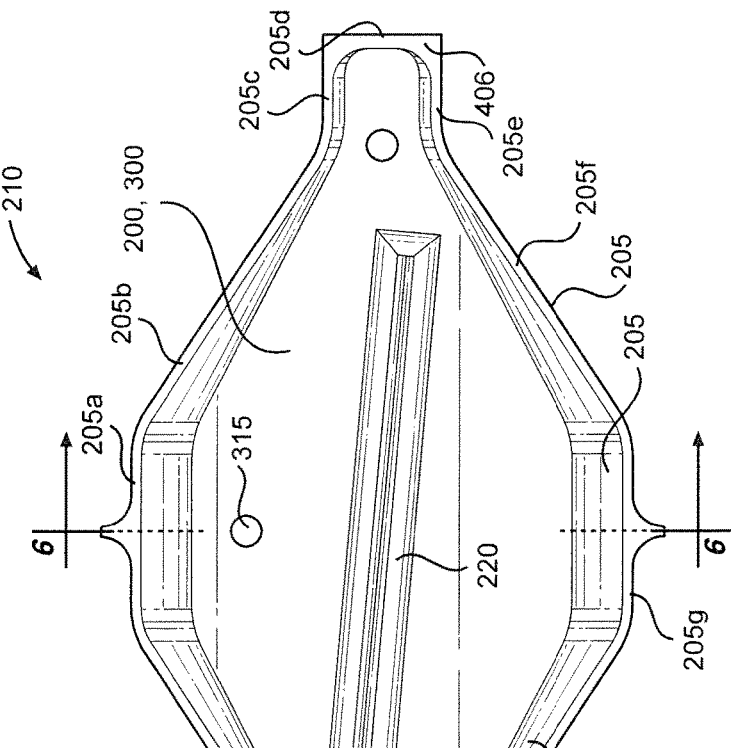
FIG. 5 is a top view of the dough cutter mold.

FIGS. 4 and 5 are perspective and top views, respectively, of one of dough cutter molds 210. For ease of discussion, dough cutter mold 210 is shown separate from the other dough cutter molds 210 of rotary dough cutter 120. However, in the embodiment illustrated, dough cutter molds 210 are all formed integrally with one another and with shaft 200. Accordingly, it should be understood that dough cutter molds 210 are not readily separable in the manner illustrated. Of course, in other embodiments, dough cutter molds 210 can be formed as separate pieces that are removably connected to shaft 200, for example.

Regardless, FIGS. 4 and 5 show how walls 205 and shaft 200 define an interior 400 of dough cutter mold 210. In operation, rotation of rotary dough cutter 120 results in interior 400 receiving one of dough pieces 125, with walls 205 cutting dough piece 125 from dough sheet 100 and shaping dough piece 125. Interior blade 220 is located within interior 400 and scores any dough piece 125 received in interior 400. After some additional rotation of rotary dough cutter 120, the dough piece 125 located in interior 400 is discharged from interior 400 by forcing air through air outlets 315. Eventually, further rotation results in another dough piece 125 being received in interior 400. This cycle repeats continuously so long as dough sheet 100 is present and rotary dough cutter 120 is rotating.

Dough cutter mold 210 has a first end 405 and a second end 406 spaced longitudinally from one another. Interior blade 220 generally extends lengthwise of dough cutter mold 210 between first end 405 and second end 406. Therefore, interior blade 220 is cantilevered from shaft 200. In the embodiment shown, interior blade 220 is actually offset or angled relative to the longitudinal axis of dough cutter mold 210. However, interior blade 220 can be parallel to the longitudinal axis of dough cutter mold 210.

Dough cutter mold 210 generally defines a twelve-sided shape, with twelve corresponding walls 205. For ease of discussion, these walls 205 are labeled 205*a*-1. Certain of walls 205*a*-1 are parallel to one another. Specifically, these parallel sets of walls 205 include: walls 205*a* and 205*g*; walls 205*b* and 205*h*; walls 205*c*, 205*e*, 205*i* and 205*k*; walls 205*d* and 205*j*; and walls 205*f* and 205*l*. Walls 205*b* and 205*f* are located opposite one another across the longitudinal axis of dough cutter mold 210 and are angled in opposite directions from the longitudinal axis. Similarly, walls 205*h* and 205*l* are located opposite one another across the longitudinal axis of dough cutter mold 210 and are angled in opposite directions from the longitudinal axis. Interior blade 220 is spaced from walls 205, with one end of interior blade 220 being located nearer to wall 205*l* than wall 205*h* and the other end being located near to wall 205*f* than wall 205*b*.

Although not shown in FIGS. 4 and 5, it should be recognized, based on FIGS. 1 and 2 as well as the discussion above, that additional dough cutter molds 210 are provided on rotary dough cutter 120 immediately adjacent to the specific dough cutter mold 210 shown in FIGS. 4 and 5, with walls 205*a*-1 also defining part of these additional dough cutter molds 210. In particular, wall 205*a* defines part of two additional dough cutter molds 210, i.e., wall 205*a* defines part of three dough cutter molds 210 in total. Wall 205*g* also defines part of two additional dough cutter molds 210. Each of walls 205*b*, 205*f*, 205*h* and 205*l* defines part of one additional dough cutter mold 210. Each of the portions of walls 205*c*, 205*e*, 205*i* and 205*k* shown in FIGS. 4 and 5 defines part of one additional dough cutter mold 210. However, walls 205*c*, 205*e*, 205*i* and 205*k* actually extend further when a plurality of dough cutter molds 210 are provided such that, like walls 205*a* and 205*g*, each of walls 205*c*, 205*e*, 205*i* and 205*k* defines part of two additional dough cutter molds 210. Each of walls 205*d* and 205*j* defines part of one additional dough cutter mold 210.

Three air outlets 315 are shown in dough cutter mold 210. Specifically, these air outlets 315 are located near first end 405, second end 406 and wall 205*a*. However, it should be recognized that air outlets 315 can be located elsewhere. Also, different numbers of air outlets 315 can be provided depending on factors such as the size of air outlets 315 and the composition of dough sheet 100. In fact, air outlets 315 can be omitted in some embodiments.

Figure 6:
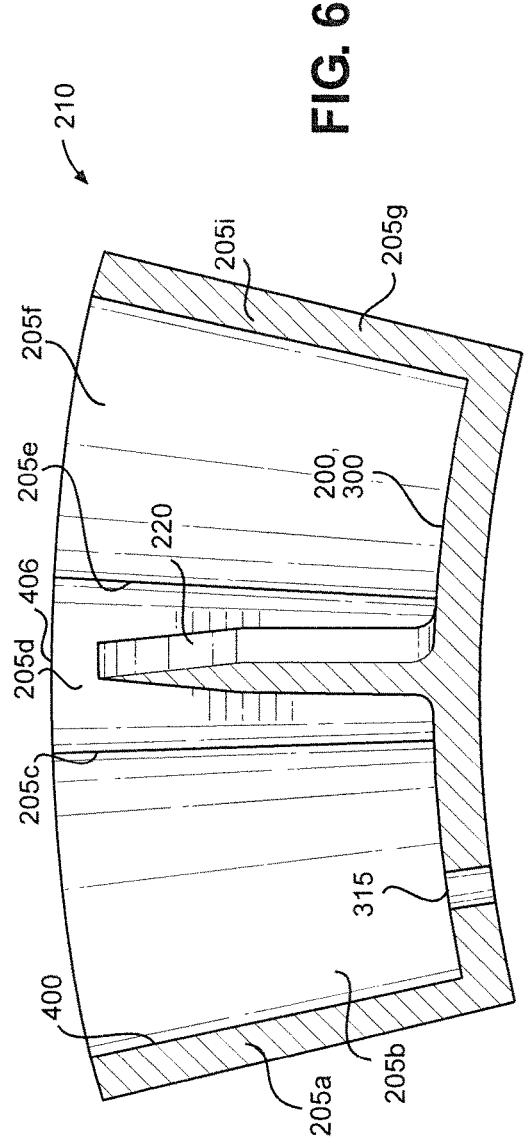
FIG. 6 is a cross section of the dough cutter mold.
Figure 7:
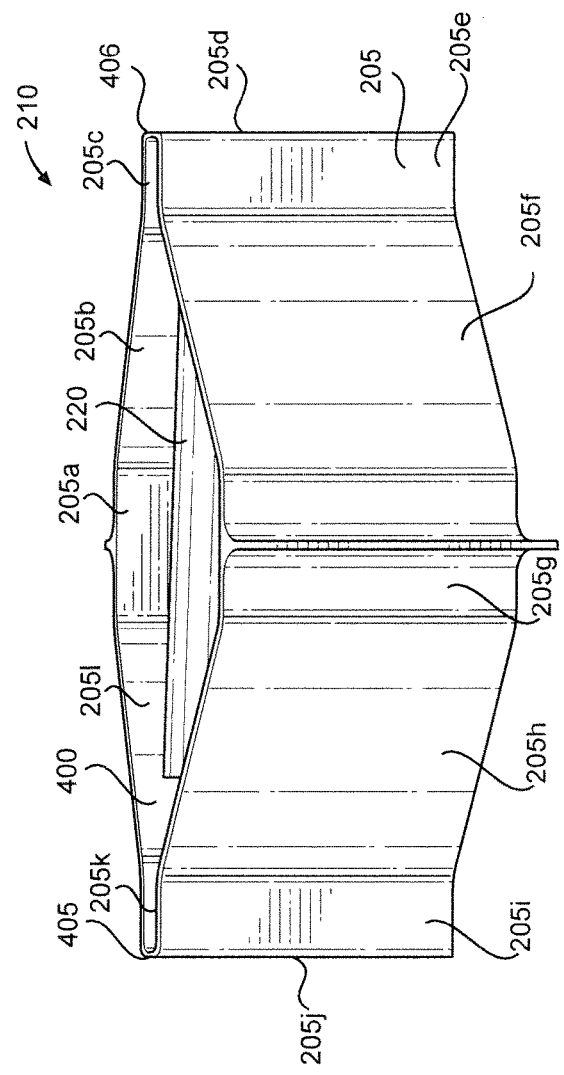
FIG. 7 is a side view of the dough cutter mold.

FIG. 6 is a cross section of dough cutter mold 210 taken along line 6-6 of FIG. 5, while FIG. 7 is a side view of dough cutter mold 210. These views help show that interior blade 220 is shorter than walls 205, i.e., interior blade 220 extends a lesser distance from exterior 300 of shaft 200. Accordingly, interior blade 220 scores dough pieces 125 rather than cutting all the way through dough pieces 125.

FIG. 8 shows one of dough pieces 125 after it has been discharged from rotary dough cutter 120. The shape of dough piece 125 generally matches the shape of dough cutter mold 210. Dough piece 125 has a sidewall 800 and an upper surface 805. A slit 810 is formed in upper surface 805, generally extending along the longitudinal axis of dough piece 125. The shape of dough piece 125 is determined by walls 205, and slit 810 is created by one of interior blades 220. After formation of dough piece 125 in rotary dough cutter 120, dough piece 125 is preferably proofed and then frozen. Once frozen, dough piece 125 can be transported to a bakery operator, for example, who thaws, bakes, and sells the resulting bread product. In the embodiment illustrated, dough piece 125 is in the form of a bolillo. However, it should be recognized that other bread products can be produced in accordance with the present invention.

FIG. 9 is a perspective view of a rotary dough cutter 900 constructed in accordance with another embodiment of the present invention. Rotary dough cutter 900 includes a cylindrical shaft 905. A plurality of walls 910 extends radially outward from shaft 905. Walls 910 define a plurality of dough cutter molds 915. In other words, walls 910 can be considered to be the exterior walls or sidewalls of dough cutter molds 915. Walls 910 act as blades (either sharp or blunt edge blades) and are configured to cut dough pieces from a dough sheet (not shown), with one dough piece being received in and shaped by each dough cutter mold 915. Because there is no negative space provided between the majority of dough cutter molds 915, a given portion of one of walls 910 can define part of more than one dough cutter mold 915. This minimization of negative space is accomplished by using a tessellated pattern of dough cutter molds 915.

In addition to walls 910, a plurality of interior blades 920 extends radially outward from shaft 905. Interior blades 920 are located within dough cutter molds 915 and are configured to score dough pieces as the dough pieces are formed from a dough sheet. In other words, interior blades 920 are configured to cut into but not all the way through the dough sheet. While two interior blades 920 are shown in each dough cutter mold 915, it should be understood that dough cutter molds 915 can include more or fewer interior blades 920 if desired. Like interior blades 220, interior blades 920 are shown straight and extend across dough cutter molds 915. Unlike interior blades 220, interior blades 920 are shown to extend all the way across dough cutter molds 915, i.e., interior blades 920 are not spaced from walls 910 but instead are integrated with and contact walls 910. Of course, it should be understood that interior blades 920 could extend partially across walls 910 in a manner similar to interior blades 220 so as to be cantilevered. In any case, interior blades 220 and 920, as well as dough cutter molds 210 and 915, can take different forms depending upon the application.

Rotary dough cutter 900 also includes a central hole 925 extending longitudinally through shaft 905. Driveshaft 130 extends through central hole 925 to mount rotary dough cutter 900 to driveshaft 130. Although not shown, like rotary dough cutter 120, rotary dough cutter 900 can further include a plurality of air passages extending longitudinally through shaft 905, with a plurality of air outlets extending radially from the air passages to dough cutter molds 915. Air from air supply hose 155 travels through the air passages and air outlets to dough cutter molds 915 to help discharge dough pieces from dough cutter molds 915.

FIG. 10 shows a dough piece 1000 after it has been discharged from rotary dough cutter 900. The shape of dough piece 1000 generally matches the shape of dough cutter mold 915. Dough piece 1000 has a base 1005, a sidewall 1010 and an upper surface 1015. Slits 1020 are formed in upper surface 1015 and extend all the way across upper surface 1015. The shape of dough piece 1000 is determined by walls 910, and slits 1020 are created by interior blades 920. After formation of dough piece 1000 in rotary dough cutter 900, dough piece 1000 is preferably proofed and then frozen. In the embodiment illustrated, dough piece 1000 is in the form of a hard roll. However, it should be recognized that other bread products can be produced in accordance with the present invention.

Based on the above, it should be readily apparent that the present invention provides dough products that are scored prior to being proofed and frozen (i.e., before being purchased by bakery operators), as well as an apparatus and method for producing the dough products. While certain preferred embodiments of the present invention have been set forth, it should be understood that various changes or modifications could be made without departing from the spirit of the present invention. In general, the invention is only intended to be limited by the scope of the following claims.

The invention claimed is:

1. A rotary dough cutter comprising:
 a shaft;
 a plurality of walls extending radially outward from the shaft, wherein the plurality of walls are configured to cut a plurality of dough pieces from a dough sheet, the plurality of walls define a plurality of dough cutter molds, the plurality of dough cutter molds include a first dough cutter mold and a second dough cutter mold, and a first wall of the plurality of walls defines part of both the first dough cutter mold and the second dough cutter mold; and
 a plurality of interior blades extending radially outward from the shaft, wherein the plurality of interior blades are configured to score the plurality of dough pieces, and each one of the plurality of interior blades is located in only one of the plurality of dough cutter molds wherein each of the plurality of interior blades, in height is shorter than a height of each of the plurality of the walls, extends lengthwise of each of the plurality of the dough cutter molds, is spaced from each of the plurality of the walls and cantilevered from the shaft.

2. The rotary dough cutter of claim 1, wherein a second wall of the plurality of walls defines part of both the first dough cutter mold and the second dough cutter mold.

3. The rotary dough cutter of claim 2, wherein a third wall of the plurality of walls defines part of both the first dough cutter mold and the second dough cutter mold.

4. The rotary dough cutter of claim 1, wherein the plurality of dough cutter molds include a third dough cutter mold, and a fourth wall of the plurality of walls defines part of both the first dough cutter mold and the third dough cutter mold.

5. The rotary dough cutter of claim 4, wherein the first wall is parallel to the fourth wall.

6. The rotary dough cutter of claim 1, wherein the plurality of dough cutter molds include a third dough cutter mold, and the first wall defines part of the third dough cutter mold.

7. The rotary dough cutter of claim 1, wherein the plurality of dough cutter molds are arranged in a tessellated pattern.

8. The rotary dough cutter of claim 1, wherein each of the plurality of dough cutter molds is defined by at least six walls of the plurality of walls.

9. The rotary dough cutter of claim 1, wherein the first dough cutter mold has a first end and a second end spaced longitudinally from one another, and an interior blade of the plurality of interior blades extends in a longitudinal direction of the first dough cutter mold between the first end and the second end.

10. The rotary dough cutter of claim 9, wherein the interior blade is angled relative to a longitudinal axis of the first dough cutter mold.

11. A method of producing a plurality of dough pieces using a rotary dough cutter including a shaft, a plurality of walls extending radially outward from the shaft and a plurality of interior blades extending radially outward from the shaft, wherein the plurality of walls define a plurality of dough cutter molds, the plurality of dough cutter molds include a first dough cutter mold and a second dough cutter mold, a first wall of the plurality of walls defines part of both the first dough cutter mold and the second dough cutter mold, and each one of the plurality of interior blades is located in only one of the plurality of dough cutter molds, wherein each of the plurality of interior blades, in height is shorter than a height of each of the plurality of the walls, extends lengthwise of each of the plurality of the dough cutter molds, is spaced from each of the plurality of the walls and cantilevered from the shaft the method comprising:
  cutting the plurality of dough pieces from a dough sheet with the plurality of walls; and
  scoring the plurality of dough pieces with the plurality of interior blades upon cutting the plurality of dough pieces from the dough sheet.

12. The method of claim 11, further comprising proofing the plurality of dough pieces after scoring the plurality of dough pieces.

13. The method of claim 12, further comprising freezing the plurality of dough pieces after proofing the plurality of dough pieces.

14. The method of claim 11, wherein a second wall of the plurality of walls defines part of both the first dough cutter mold and the second dough cutter mold, and cutting the plurality of dough pieces from the dough sheet includes cutting the dough sheet with the second wall.

15. The method of claim 14, wherein a third wall of the plurality of walls defines part of both the first dough cutter mold and the second dough cutter mold, and cutting the plurality of dough pieces from the dough sheet includes cutting the dough sheet with the third wall.

16. The method of claim 11, wherein the plurality of dough cutter molds include a third dough cutter mold, a fourth wall of the plurality of walls defines part of both the first dough cutter mold and the third dough cutter mold, and cutting the plurality of dough pieces from the dough sheet includes cutting the dough sheet with the fourth wall.

17. The method of claim 11, wherein the plurality of dough cutter molds include a third dough cutter mold, the first wall defines part of the third dough cutter mold, and cutting the plurality of dough pieces from the dough sheet includes cutting the dough sheet with the first wall.

18. The method of claim 11, wherein the plurality of dough cutter molds are arranged in a tessellated pattern, and cutting the plurality of dough pieces from the dough sheet includes cutting the dough sheet such that the plurality of dough pieces is arranged in a tessellated pattern.

19. The method of claim 11, wherein the first dough cutter mold has a first end and a second end spaced longitudinally from one another, an interior blade of the plurality of interior blades extends in a longitudinal direction of the first dough cutter mold between the first end and the second end, and scoring the plurality of dough pieces includes scoring the plurality of dough pieces with the interior blade.

\* \* \* \* \*